United States Patent
Kim et al.

(10) Patent No.: US 10,965,359 B2
(45) Date of Patent: Mar. 30, 2021

(54) WIRELESS COMMUNICATION DEVICE CAPABLE OF FAST BEAM SELECTION AND METHOD OF OPERATION THEREOF

(71) Applicant: Samsung Electronics Co., Ltd., Suwon-si (KR)

(72) Inventors: Joontae Kim, Seoul (KR); Junho Lee, Hwaseong-si (KR); Sungyoon Cho, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 16/794,753

(22) Filed: Feb. 19, 2020

(65) Prior Publication Data

US 2020/0274593 A1    Aug. 27, 2020

(30) Foreign Application Priority Data

Feb. 22, 2019   (KR) .................. 10-2019-0021298
Jun. 3, 2019    (KR) .................. 10-2019-0065473

(51) Int. Cl.
  *H04B 7/06* (2006.01)
  *H04W 16/28* (2009.01)
  *H04B 7/0408* (2017.01)
  *H04B 7/155* (2006.01)

(52) U.S. Cl.
  CPC ......... *H04B 7/0617* (2013.01); *H04B 7/0408* (2013.01); *H04B 7/0619* (2013.01); *H04B 7/0695* (2013.01); *H04B 7/15571* (2013.01); *H04W 16/28* (2013.01)

(58) Field of Classification Search
  CPC .. H04B 7/0617; H04B 7/0619; H04B 7/0695; H04B 7/0408; H04B 7/15571; H04B 7/10; H04B 7/088; H04W 16/28
  See application file for complete search history.

(56) References Cited

U.S. PATENT DOCUMENTS

| | | | |
|---|---|---|---|
| 8,981,993 B2 | 3/2015 | Petersson et al. | |
| 9,001,879 B2 * | 4/2015 | Maltsev ............... | H04B 7/0413 375/227 |
| 9,654,264 B2 | 5/2017 | Athley et al. | |
| 9,685,702 B2 | 6/2017 | Hu et al. | |
| 10,015,800 B2 | 7/2018 | Jo et al. | |
| 10,039,011 B2 | 7/2018 | Bahng et al. | |

(Continued)

*Primary Examiner* — Kenneth T Lam
(74) *Attorney, Agent, or Firm* — Harness, Dickey and Pierce, P.L.C.

(57) ABSTRACT

Provided is a method of operating a wireless communication device including a phased array including a first antenna group and a second antenna group to form a beam for transmitting and receiving signals polarized in different directions, which includes receiving first signals polarized in a first direction; receiving second signals polarized in a second direction; measuring power of the first signals and power of the second signals; analyzing a relationship between a channel corresponding to the first receiving beam and a channel corresponding to the second receiving beam; estimating power of third signals that are expected to be received through the first antenna group and power of fourth signals that are expected to be received through the second antenna group; and selecting a receiving beam pattern for wireless communication.

20 Claims, 16 Drawing Sheets

(56) References Cited

U.S. PATENT DOCUMENTS

| | | | |
|---|---|---|---|
| 2006/0105730 A1* | 5/2006 | Modonesi | H04B 7/10 |
| | | | 455/273 |
| 2008/0111740 A1 | 5/2008 | Hirabe | |
| 2016/0345216 A1 | 11/2016 | Kishiyama et al. | |
| 2017/0207839 A1 | 7/2017 | Eitan et al. | |
| 2019/0068268 A1* | 2/2019 | Zhang | H04W 76/27 |
| 2020/0112926 A1* | 4/2020 | Laghate | H04B 7/0404 |
| 2020/0137739 A1* | 4/2020 | Kim | H04W 72/02 |
| 2020/0169306 A1* | 5/2020 | Kim | H04B 7/0617 |

* cited by examiner

WIRELESS COMMUNICATION DEVICE CAPABLE OF FAST BEAM SELECTION AND METHOD OF OPERATION THEREOF

CROSS-REFERENCE TO RELATED APPLICATION

This application claims the benefit of Korean Patent Application Nos. 10-2019-0021298 filed on Feb. 22, 2019, and 10-2019-0065473 filed on Jun. 3, 2019, in the Korean Intellectual Property Office, the disclosures of which are incorporated herein in their entireties by reference.

BACKGROUND

Example embodiments of the inventive concepts relate to a wireless communication device capable of fast beam selection.

Recently, a fifth-generation (5G) communication system, which is new radio access technology, aims to provide an ultrahigh-speed data service of several Gbps using an ultra-wideband with a bandwidth of 100 MHz or more compared to long-term evolution (LTE) and LTE advanced (LTE-A). However, it is difficult to obtain an ultra-wideband frequency of 100 MHz or more in a frequency band of several hundred MHz or several GHz, which is used in LTE and LTE-A, and thus, a method of transmitting signals using a wide frequency band, which is in a frequency band of 6 GHz or more, is being considered in the 5G communication system. Specifically, a technique of increasing a transmission rate using a millimeter wave band, such as 28 GHz and 60 GHz bands, is being considered in the 5G communication system. However, since a frequency band is proportional to the path loss of radio waves, a service area may be reduced because the path loss of the radio waves is large in an ultrahigh frequency band such as the millimeter wave band.

In order to overcome the reduction of the service area, a beamforming technique for increasing a range of the radio waves by generating directional beams using a plurality of antennas has been highlighted in the 5G communication system. The beamforming technique may be applied to each of a transmission device (e.g., a base station) and a receiving device (e.g., a terminal) and may not only expand the service area but also reduce interference due to the focusing of physical beams toward a target.

In the 5G communication system, a directional direction of transmission beams of the transmission device has to be aligned with a directional direction of receiving beams of the receiving device to increase the effects of the beamforming technique, and thus, a technique of selecting desired (or, alternatively, optimum) transmission beams and receiving beams is important. In addition, a technique for selecting desired (or, alternatively, optimal) transmission beams and receiving beams fast so as to meet the low latency scheme of the 5G communication system is also highlighted.

SUMMARY

Example embodiments of the inventive concepts provide a wireless communication device and/or a method of operation thereof capable of fast selection of a pattern of a receiving beam aligned optimally with a desired (or, alternatively, a predetermined) cell in a wireless communication system and/or an operation method thereof.

According to an example embodiment of the inventive concepts, there is provided a method of operating a wireless communication device that includes a phased array, the phased array including a first antenna group and a second antenna group.

In some example embodiments, the method includes receiving first signals polarized in a first direction by sweeping a first receiving beam formed in the first antenna group to have first patterns of a plurality of patterns; receiving second signals polarized in a second direction by sweeping a second receiving beam formed in the second antenna group to have second patterns of the plurality of patterns; measuring power of the first signals and power of the second signals; analyzing a relationship between a channel corresponding to the first receiving beam and a channel corresponding to the second receiving beam; estimating, based on the relationship, power of third signals expected to be received through the first antenna group when the first receiving beam is swept to have patterns other than the first patterns of the plurality of patterns and power of fourth signals that are expected to be received through the second antenna group when the second receiving beam is swept to have patterns other than the second patterns of the plurality of patterns; and selecting a receiving beam pattern based on the power of the first signals, the power of the second signals, the power of the third signals, and the power of the fourth signals.

According to an example embodiment of the inventive concepts, there is provided a cell search method performed by a wireless communication device.

In some example embodiments, the cell search method includes receiving first signals polarized in a first direction by sweeping a first receiving beam to have first patterns of a plurality of patterns; receiving second signals polarized in a second direction by sweeping a second receiving beam to have second patterns of the plurality of patterns; measuring power of the first signals and power of the second signals; calculating a ratio between power of a first comparison signal and power of a second comparison signal, the first comparison signal and the second comparison signal each corresponding to at least one reference pattern shared between the first patterns and the second patterns; estimating, based on the ratio, power of third signals expected to be received when the first receiving beam is swept to have patterns other than the first patterns of the plurality of patterns and power of fourth signals expected to be received when the second receiving beam is swept to have patterns other than the second patterns of the plurality of patterns; and selecting a candidate cell and a receiving beam pattern based on the power of the first signals, the power of the second signals, the power of the third signals, and the power of the fourth signals.

Some example embodiments relate to a wireless communication device.

In some example embodiments, the wireless communication device includes a phased array including a first antenna group and a second antenna group, the phased array configured to form a beam for transmitting and receiving signals polarized in different directions; and a processor configured to, control sweeping such that a first receiving beam formed in the first antenna group has first patterns of a plurality of patterns and a second receiving beam formed in the second antenna group has second patterns of the plurality of patterns, generate measured power information by measuring power of first signals polarized in a first direction received through the first receiving beam and power of second signals polarized in a second direction received through the second receiving beam, generate estimated power information by estimating, based on the measured power information, power of third signals expected to be received through the first antenna group when the first receiving beam is swept to have patterns other than the first patterns of the plurality of patterns and power of fourth signals expected to be received through the second antenna group when the second receiving beam is swept to have patterns other than the second patterns of the plurality of patterns, and prepare for wireless communication based on the measured power information and the estimated power information.

BRIEF DESCRIPTION OF THE DRAWINGS

Example embodiments of the inventive concepts will be more clearly understood from the following detailed description taken in conjunction with the accompanying drawings in which.

DETAILED DESCRIPTION

Figure 1:
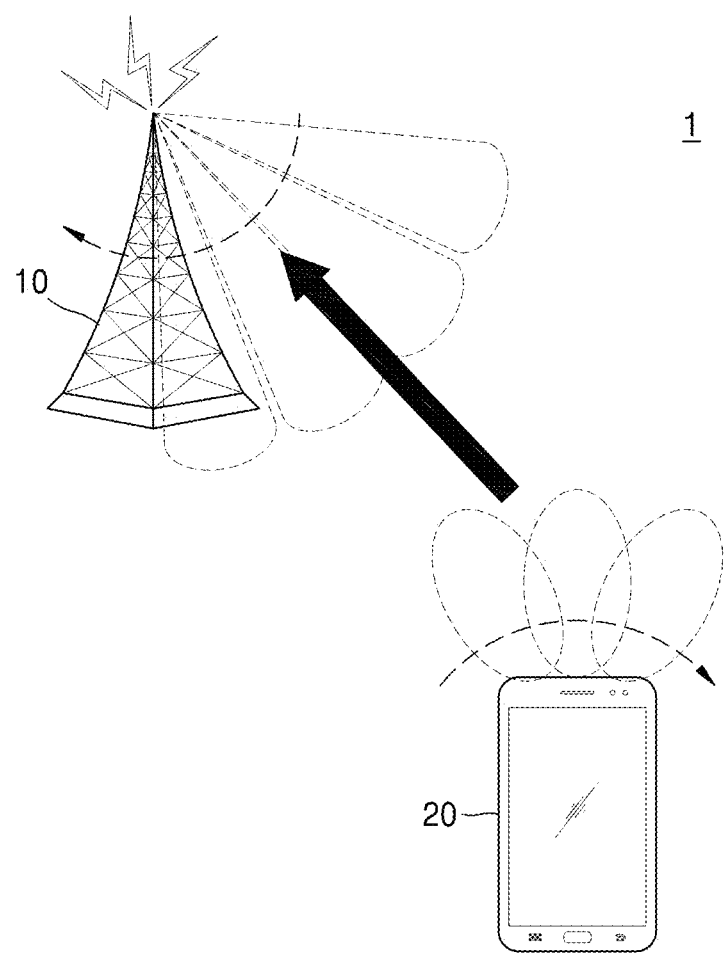
FIG. 1 is a block diagram of a wireless communication system according to an example embodiment.

A base station may be a subject, which communicates with a wireless communication device and assigns communication network resources to the wireless communication device. The base station may be at least one of a cell, a base station (BS), a NodeB (NB), an eNodeB (eNB), a next-generation radio access network (NG RAN), a wireless communication unit, a base station controller, or a node on a network. Hereinafter, the base station will be referred to as a cell.

The wireless communication device may be a subject, which communicates with a base station or another wireless communication device. The wireless communication device may be referred to as a node, user equipment (UE), next-generation (NG) UE, a mobile station (MS), mobile equipment (ME), a device, or a terminal.

In addition, the wireless communication device may include at least one of a smartphone, a tablet personal computer (PC), a mobile phone, a video phone, an electronic book (e-book) reader, a desktop PC, a laptop PC, a netbook computer, a personal digital assistant (PDA), a portable multimedia player (PMP), an MPEG-1 audio layer 3 (MP3) player, medical equipment, a camera, or a wearable device. In addition, the wireless communication device may include at least one of a television (TV), a digital video disk (DVD) player, an audio player, a refrigerator, an air conditioner, a vacuum cleaner, an oven, a microwave oven, a washing machine, an air purifier, a set top box, a home automation control panel, a security control panel, a media box (e.g., Samsung HomeSync™, Apple TV™, or Google TV™), a game console (e.g., Xbox™ and PlayStation™), an electronic dictionary, an electronic key, a camcorder, or an electronic frame. Furthermore, the wireless communication device may include at least one of various pieces of medical equipment (e.g., various pieces of portable medical measuring equipment (e.g., a blood glucose meter, a heart rate meter, a blood pressure meter, a clinical thermometer, or the like), magnetic resonance angiography (MRA) equipment, magnetic resonance imaging (MRI) machine computed tomography (CT) equipment, a camera, an ultrasonic device, or the like), a navigation device, a global navigation satellite system (GNSS), an event data recorder (EDR), a flight data recorder (FDR), an automotive infotainment device, marine electronic equipment (e.g., a marine navigation system, a gyro compass, and the like), avionics, a security device, a heat unit for vehicles, an industrial or home robot, a drone, an automated teller machine (ATM) of financial institutions, a point of sales (POS) of stores, or Internet of Things (IoT) devices (e.g., a light bulb, various sensors, a sprinkler, a fire alarm, a thermostat, a street light, a toaster, exercise equipment, a hot water tank, a heater, a boiler, and the like). In addition, the wireless communication device may be various types of multimedia systems capable of performing communication functions.

Hereinafter, example embodiments will be described in detail with reference to the accompanying drawings.

FIG. 1 is a block diagram of a wireless communication system 1 according to an example embodiment.

Referring to FIG. 1, the wireless communication system 1 may include a cell 10 and a wireless communication device 20. For the sake of convenience, although FIG. 1 illustrates an example embodiment in which the wireless communication system 1 includes only one cell 10, this is merely an example embodiment, and the inventive concepts are not limited thereto. The wireless communication system 1 may include various numbers of base stations. Also, although it is assumed that the wireless communication system 1 is a 5G communication system to which beamforming technology is applied, this is merely an example embodiment, and it is obvious that the concepts of the inventive concepts may also be applied to various communication systems. The cell 10 may be connected to the wireless communication device 20 via a wireless channel and provide various communication services. The cell 10 may service all user traffic through a shared channel and collect and schedule state information (e.g., a buffer state, an available transmission power state, and a channel state) of the wireless communication device 20. The wireless communication system 1 may support a beamforming technique by using orthogonal frequency division multiplexing (OFDM) as radio access technology. Also, the wireless communication system 1 may support an adaptive modulation & coding (AMC) scheme for determining a modulation scheme and a channel coding rate in accordance with a channel state of the wireless communication device 20. The wireless communication device 20 according to an example embodiment may include a phased array configured to simultaneously transmit or receive signals polarized in two or more different directions.

In addition, the wireless communication system 1 may transmit and receive signals using a wide frequency band, which is in a frequency band of 6 GHz or more. For example, in the wireless communication system 1, a data transmission rate may be increased using a millimetre wave band, such as a 28-GHz band or a 60-GHz band. In this case, since the millimeter wave band has a relatively large signal attenuation size per distance, to ensure coverage, the wireless communication system 1 may support a transceiving operation on the basis of directional beams generated using a multiple antenna. The wireless communication system 1 may be a system configured to support multiple-input and multiple-output (MIMO), and thus, the cell 10 and the wireless communication device 20 may support a beamforming technique. The beamforming technique may be classified into a digital beamforming technique, an analog beamforming technique, and a hybrid beamforming technique, and the inventive concepts may be applied to all beamforming techniques.

The wireless communication device 20 according to the example embodiment may perform a beam sweeping operation on receiving beams to enable directional beam-based transceiving operations. The beam sweeping operation may refer to a process of sequentially or randomly sweeping directional beams having a desired (or, alternatively, a predetermined) pattern by each of the cell 10 and the wireless communication device 20 and selecting patterns of a transmission beam and a receiving beam of which directional directions are aligned with each other. A pattern (or a beam pattern) may be a shape of a beam, which is determined by a width of the beam and a directional direction of the beam. The pattern of the transmission beam and the pattern of the receiving beam of which the directional directions are aligned with each other may be selected as a pair of transceiving beam patterns. That is, when the cell 10 transmits data through a transmission beam having a selected pattern, the wireless communication device 20 may receive the data through a receiving beam having a selected pattern. Further, the wireless communication device 20 may form a transmitting beam having the same pattern as the selected pattern of the receiving beam and transmit desired (or, alternatively, predetermined) data to the cell 10. Although the wireless communication device 20 receives a signal from the one cell 10 in FIG. 1, this is merely an example embodiment, and the inventive concepts are not limited thereto. The wireless communication device 20 may receive signals from a plurality of cells simultaneously. Hereinafter, an operation performed by the wireless communication device 20 of selecting the pattern of the receiving beam according to the example embodiment will be described.

The wireless communication device 20 may include a phased array provided with a first antenna group and a second antenna group to form beams for transmitting and receiving signals polarized in different directions. The first antenna group may include antennas (or element antennas) for receiving first signals polarized in a first direction, and the second antenna group may include antennas (or element antennas) for receiving second signals polarized in a second direction.

The wireless communication device 20 may receive the first signals polarized in the first direction by performing the beam sweeping operation such that a first receiving beam formed in the first antenna group has first patterns among a plurality of patterns. The wireless communication device 20 may receive the second signals polarized in the second direction by performing the beam sweeping operation such that a second receiving beam formed in the second antenna group has second patterns among the plurality of patterns. Specifically, the wireless communication device 20 may provide phase/gain control signals to the first antenna group and the second antenna group, respectively, to form the receiving beam or the transmitting beam having the plurality of patterns. The plurality of patterns may be those that may be commonly formed in the first antenna group and the second antenna group. The wireless communication device 20 may select some of the plurality of patterns as the first patterns and select some of the plurality of patterns as the second patterns. The first patterns may include different patterns compared to the patterns included in the second patterns.

The wireless communication device 20 may measure power of the first signals received through the first antenna group and power of the second signals received through the second antenna group. The power of the signals may be referred to as intensity of the signals. In some embodiments, the wireless communication device 20 may receive any one of a received signal strength indication (RSSI), a carrier to interference and noise ratio (CINR), a signal to interference ratio (SIR), and a reference signal received power (RSRP) value as the power of the signal.

The wireless communication device 20 may analyze the relationship between a channel corresponding to the first receiving beam and a channel corresponding to the second receiving beam. Specifically, the channel corresponding to the first receiving beam may mean a channel experienced by the first signal polarized in the first direction and received, and the channel corresponding to the second receiving beam may mean a channel experienced by the second signal polarized in the second direction and received. The channel experienced by the first signal or the second signal may vary depending on a pattern of the first receiving beam or the second receiving beam. However, when the pattern of the first receiving beam is the same as the pattern of the second receiving beam, a constant relationship between the channel experienced by the first signal received through the first receiving beam and the channel experienced by the second signal received through the second receiving beam may be established. Specifically, the relationship may be caused by a polarization characteristic of the first signal in the first direction and a polarization characteristic of the second signal in the second direction, and this relationship may be applied to other channels. For example, the relationship between the channel of the first signal and the channel of the second signal respectively received through the first receiving beam and the second receiving beam having the same pattern x (where x is an arbitrary integer) may be the same as the relationship between the channel of the first signal and the channel of the second signal respectively received through the first receiving beam and the second receiving beam having the same pattern y (where y is an arbitrary integer).

The wireless communication device 20 may estimate power of third signals that are expected to be received through the first antenna group when the first receiving beam is swept to have patterns other than the first patterns among the plurality of patterns based on an analysis result. Also, the wireless communication device 20 may estimate power of fourth signals that are expected to be received through the second antenna group when the second receiving beam is swept to have patterns other than the second patterns among the plurality of patterns based on the analysis result. That is, the wireless communication device 20 may not perform the beam sweeping operation such that the first and second receiving beams respectively formed in the first and second antenna groups sequentially have all patterns if possible and may perform the beam sweeping operation such that the first receiving beam has some of all the patterns if possible and the second receiving beam has the other patterns if possible, thereby reducing the time required for the beam sweeping operation. In addition, the wireless communication device 20 may quickly estimate power of signals that are expected to be received through patterns that the first receiving beam and the second receiving beam do not have, thereby minimizing loss that does not measure the power of the signals received through some patterns skipped in the beam sweeping operation.

The wireless communication device 20 may select a receiving beam pattern for wireless communication by using the measured power of the first signals and power of the second signals and the estimated power of the third signals and power of the fourth signals. As described above, the receiving beam pattern selected by the example embodiments may be selected as a transmitting beam pattern.

The wireless communication device 20 may perform the beam sweeping operation, a power measurement of received signals, a channel relationship analysis between signals having different polarization directions, and a power estimation of signals that are expected to be received for search for an operating carrier frequency for each frequency band, search for a cell in an environment where receiving beamforming is applied in a specific frequency band, and the like according to the example embodiments.

The wireless communication device 20 according to the example embodiments may effectively reduce the time required for beam sweeping by performing the beam sweeping operations such that receiving beams having different polarization directions have different patterns along the respective polarization directions and may efficiently and quickly determine an optimal receiving beam pattern by compensating for possible performance loss due to some patterns skipped in the beam sweeping operation.

Figure 2:
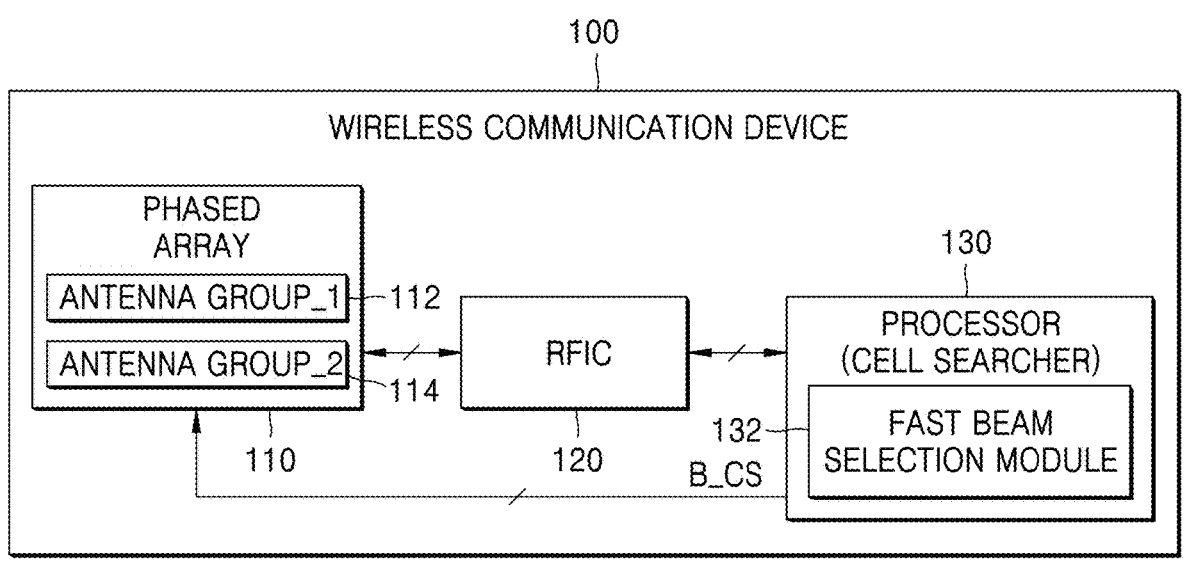
FIG. 2 is a block diagram of a wireless communication device according to an example embodiment.

FIG. 2 is a block diagram of a wireless communication device 100 according to an example embodiment.

Referring to FIG. 2, the wireless communication device 100 may include a phased array 110, a radio frequency integrated circuit (RFIC) 120, and a processor 130. In some embodiments, the processor 130 may be referred to as a cell searcher. The phased array 110 may communicate with the RFIC 120, and the RFIC 120 may communicate with the processor 130. Although the wireless communication device 100 includes one phased array 110 in the example of FIG. 2, in some example embodiments, the wireless communication device 100 may include more phased arrays, and each phased array may include more antenna groups. The phased array 110 may include a plurality of antennas. The plurality of antennas of the phased array 110 may be used to form a transceiving beam in some example embodiments, and in some example embodiments, the phased array 110 may include an antenna configured to transmit or receive a signal polarized in a desired (or, alternatively, a predetermined) direction and may include an antenna configured to simultaneously transmit or receive signals polarized in two or more different directions.

The RFIC 120 may be connected to the plurality of antennas of the phased array 110 through a plurality of ports. For example, the RFIC 120 may be connected to a first antenna group 112 through a first port and to a second antenna group 114 through a second port. The RFIC 120 may process signals received from the phased array 110 in a receiving mode to generate a baseband signal. The RFIC 120 may provide the generated baseband signal to the processor 130. The RFIC 120 may provide the generated signal to the phased array 110 by processing a signal received from the processor 100 in a transmitting mode.

The processor 130 may generate data to be transmitted to the cell as the baseband signal to provide the baseband signal to the RFIC 120 and extract the data transmitted from the cell from the baseband signal received from the RFIC 120. For example, the processor 130 may include at least one digital-to-analog converter (DAC) that may output the baseband signal by converting digital data modulated from the data to be transmitted to the cell. In addition, the processor 130 may include at least one analog-to-digital converter (ADC) that may output the digital data by converting the baseband signal. In some example embodiments, the processor 130 may include at least one core that executes a series of instructions and may be referred to as a modem or a baseband processor.

As shown in FIG. 2, the phased array 110 according to example embodiments may include the first antenna group 112 including antennas for receiving the signals polarized in the first direction and the second antenna group 114 including antennas for receiving the signals polarized in the second direction.

The processor 130 according to example embodiments may include a fast beam selection module 132. The fast beam selection module 132 may provide beam control signals B_CS to the first antenna group 112 and the second antenna group 114 to perform a beam sweeping operation such that a first receiving beam formed in the first antenna group 112 has first patterns among a plurality of patterns and to perform the beam sweeping operation such that a second receiving beam formed in the second antenna group 114 has second patterns among the plurality of patterns. The beam control signal B_CS may be for controlling the phase or gain of each of a plurality of antennas of the phased array 110.

The fast beam selection module 132 may measure power of the first signals received through the first antenna group 112 and passed through the RFIC 120 and power of the second signals received through the second antenna group 114 and passed through the RFIC 120. However, this is only an example embodiment, and the RFIC 120 may measure the power of the first signals and the power of the second signals.

The fast beam selection module 132 may analyze the relationship between a channel corresponding to the first receiving beam and a channel corresponding to the second receiving beam. As an example embodiment, the fast beam selection module 132 may form the first receiving beam and the second receiving beam having the same reference pattern to analyze the relationship through the first antenna group 112 and the second antenna group 114, respectively, and may calculate a ratio between power of a first comparison signal and power of a second comparison signal received at this time. That is, the ratio between the power of the first comparison signal and the power of the second comparison signal may be an index indicating the relationship, and the fast beam selection module 132 may perform an estimation operation based on the index. Hereinafter, the ratio between the power of the first comparison signal and the power of the second comparison signal is defined as a reference ratio. However, this is an example embodiment and the inventive concepts is not limited thereto, and the fast beam selection module 132 may perform the beam sweeping operation to equally have a plurality of reference patterns, thereby calculating ratios between the power of the first comparison signals and the power of the second comparison signals received through the first receiving beam and the second receiving beam respectively and determining the reference ratio as an average value of the ratios. However, this is an example embodiment and the inventive concepts is not limited thereto, and the fast beam selection module 132 may analyze the relationship between the channel corresponding to the first receiving beam and the channel corresponding to the second receiving beam in various ways.

As an example embodiment, the reference pattern may be a pattern that is commonly included in the first patterns and the second patterns that are swept during the beam sweeping operation. Accordingly, the fast beam selection module 132 may analyze the relationship by obtaining the power of the first signal received through the first receiving beam having the reference pattern among the measured power of the first signals as the power of the first comparison signal and obtaining the power of the second signal received through the second receiving beam having the reference pattern among the measured power of the second signals as the power of the second comparison signal, without separately forming the first receiving beam and the second receiving beam having the reference pattern in the first antenna group 112 and the second antenna group 114, respectively, in order to analyze the relationship.

As another example embodiment, the first patterns and the second patterns of the beam sweeping operation may not include a common reference pattern, and the reference pattern may be dynamically set based on the power of the signals received through the phased array 110 as a result of performing the beam sweeping operation. That is, the fast beam selection module 132 may set an optimal reference pattern among the first patterns and the second patterns based on the power of the received signals. The fast beam selection module 132 may separately form the first receiving beam or the second receiving beam having the determined reference pattern and analyze the relationship by using power of the signal received through the first receiving beam or the second receiving beam and previously measured power of the signal corresponding to the reference pattern.

As another example embodiment, the reference pattern may be formed using a method different from that used in the plurality of patterns during the beam sweeping operation through the phased array 110. For example, the plurality of patterns may be formed using all the antennas included in the first antenna group 112 or the second antenna group 114, while the reference pattern may be formed using only some of the antennas included in the first antenna group 112 or the second antenna group 114. Accordingly, a width of a beam of the plurality of patterns may be different from a width of a beam of the reference pattern. At this time, the fast beam selection module 132 may analyze the relationship by separately forming the first receiving beam and the second receiving beam having the reference pattern in the first antenna group 112 and the second antenna group 114, respectively, and measuring the power of the signals received through the first receiving beam and the second receiving beam in order to analyze the relationship.

The fast beam selection module 132 may estimate power of third signals that are expected to be received through the first antenna group 112 when the first receiving beam is swept to have patterns other than the first patterns among the plurality of patterns and power of fourth signals that are expected to be received through the second antenna group 114 when the second receiving beam is swept to have patterns other than the second patterns among the plurality of patterns, based on an analysis result. For example, assuming that the first patterns do not include a pattern z (z is an arbitrary integer) and the second patterns include the pattern z in the beam sweeping operation, the fast beam selection module 132 may estimate the power of the third signal that is expected to be received through the first receiving beam having the pattern z by applying the reference ratio to the power of the second signal received through the second receiving beam having the pattern z.

The fast beam selection module 132 may perform the beam sweeping operation using the phased array 110 and power measurement and estimation operations of signals according to example embodiments during a predetermined interval (e.g., a periodic interval during which a plurality of cells transmit signals necessary for an operating carrier frequency search or cell search of the wireless communication device 100) a plurality of times and determine a cell candidate group including cells that are likely to be selected as valid cells from among a plurality of cells by using the power of the first signals, power of the second signals, power of the third signals, and power of the fourth signals that are generated as a result of the operations.

The fast beam selection module 132 may select a cell with the highest reliability from among the cell candidate group as the valid cell. Specifically, the fast beam selection module 132 may determine reliability by using a synchronization signal received from the cell candidate group through the first receiving beam and the second receiving beam having a pattern corresponding to the cell candidate group. The fast beam selection module 132 may select the pattern corresponding to the valid cell as a receiving beam pattern for communication with the valid cell.

The fast beam selection module 132 according to example embodiments may be implemented by hardware logic within the processor 130. In addition, the fast beam selection module 132 may be implemented as software logic stored in a memory as a plurality of command codes and executed by the processor 130.

For example, in some example embodiments, the processor 130 may be implemented using processing circuitry such as hardware including logic circuits, a hardware/software combination such as a processor executing software; or a combination thereof. For example, the processing circuitry may include, but is not limited to, a central processing unit (CPU), an arithmetic logic unit (ALU), a digital signal processor, a microcomputer, a field programmable gate array (FPGA), a System-on-Chip (SoC) a programmable logic unit, a microprocessor, or an application-specific integrated circuit (ASIC), etc. The processing circuitry may be configured as a special purpose computer to generate receiving beams such that receiving beams different polarization directions have different patterns along the respective polarization directions and compensate for possible performance loss due to some patterns skipped in the beam sweeping operation. Therefore, the processing circuitry may reduce the time required for beam sweeping by performing the beam sweeping operations and quickly determine an optimal receiving beam pattern.

Figure 3:
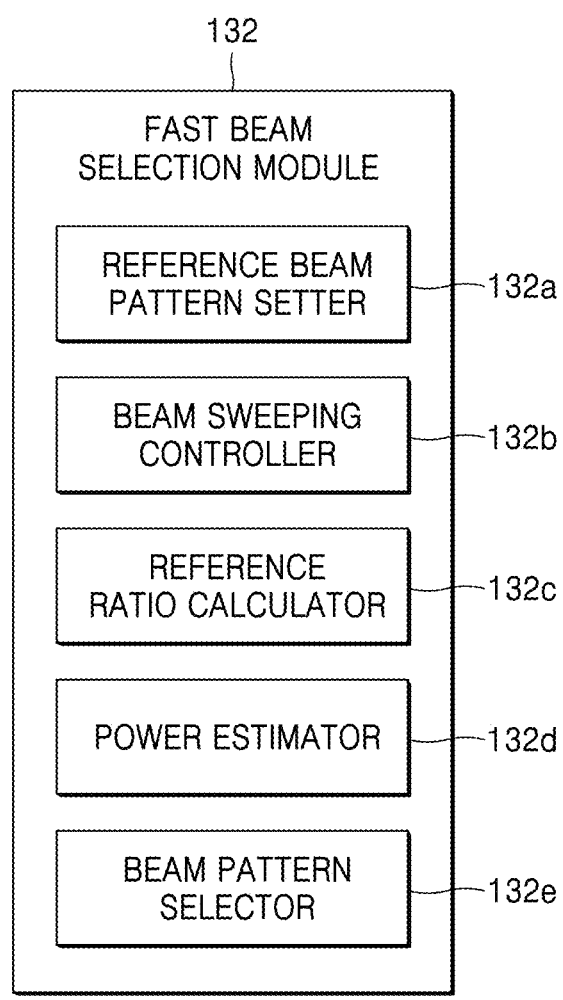
FIG. 3 is a block diagram illustrating a fast beam selection module according to an example embodiment.

FIG. 3 is a block diagram illustrating the fast beam selection module 132 according to an example embodiment. Hereinafter, FIG. 3 will be described with reference to the configuration of FIG. 2, and redundant description given with reference to FIG. 2 will be omitted.

Referring to FIGS. 2 and 3, the fast beam selection module 132 may include a reference beam pattern setter 132a, a beam sweeping controller 132b, a reference ratio calculator 132c, a power estimator 132d, and a beam pattern selector 132e. For example, the processing circuitry may be configured as a special purpose computer to perform the operations of the reference beam pattern setter 132a, the beam sweeping controller 132b, the reference ratio calculator 132c, the power estimator 132d, and the beam pattern selector 132e.

The reference beam pattern setter 132a may set at least one reference pattern for analyzing a relationship between a channel corresponding to a first receiving beam formed in the first antenna group 112 and a channel corresponding to a second receiving beam formed in the second antenna group 114. The reference beam pattern setter 132a according to an example embodiment may set the reference pattern formed using the same method as that in a plurality of patterns in a beam sweeping operation through the phased array 110. For example, the reference beam pattern setter 132a may set at least one of first patterns of the first receiving beam as the reference pattern during the beam sweeping operation and may set second patterns of the second receiving beam to include the reference pattern during the beam sweeping operation. Accordingly, the reference pattern may be formed using all the antennas included in the first antenna group 112 or the second antenna group 114. This will be described in detail with reference to FIG. 4.

The reference beam pattern setter 132a according to an example embodiment may set the reference pattern formed using a different method from that in the plurality of patterns in the beam sweeping operation through the phased array 110. For example, the reference beam pattern setter 132a may selectively use antennas included in the first antenna group 112 or the second antenna group 114 to set the reference pattern such that a first receiving beam or a second receiving beam having the reference pattern may be formed. This will be described in detail with reference to FIGS. 7A and 7B.

The reference beam pattern setter 132a according to an example embodiment may dynamically set the reference pattern based on power of signals received through the phased array 110 as a result of performing the beam sweeping operation. For example, the reference beam pattern setter 132a may select any one of the received signals having power equal to or higher than a reference value and set a pattern corresponding to the selected signal as the reference pattern. This will be described in detail with reference to FIG. 5.

The reference beam pattern setter 132a according to the example embodiment may reset the reference pattern when a reference ratio calculated based on the set reference pattern does not satisfy a predetermined condition. This will be described in detail with reference to FIG. 6.

The beam sweeping controller 132b according to the example embodiment may control the first antenna group 112 such that the first receiving beam of the first antenna group 112 has first patterns and control the second antenna group 114 such that the second receiving beam has second patterns. The beam sweeping controller 132b may control the beam sweeping operation on the first antenna group 112 and the second antenna group 114 to be performed in parallel. According to some example embodiments, each of the first patterns and the second patterns may include a common pattern (e.g., the reference pattern). Also, according to some example embodiments, the first patterns and the second patterns may not include the common pattern.

The beam sweeping controller 132b according to an example embodiment may control the beam sweeping operation on the first antenna group 112 and the second antenna group 114 based on a desired (or, alternatively, a predetermined) rule. That is, the beam sweeping controller 132b may control the beam sweeping operation such that the first patterns and the second patterns may satisfy the desired (or, alternatively, the predetermined) rule in a beam sweeping process. An embodiment in this regard will be described in detail with reference to FIGS. 9 and 10.

According to some example embodiments, the beam sweeping controller 132b may control the phased array 110 separately from the beam sweeping operation such that the first receiving beam or the second receiving beam having the reference pattern is formed so as to compute the reference ratio.

The reference ratio calculator 132c according to an example embodiment may measure power of first signals received through the first receiving beam of the first antenna group 112 and power of second signals received through the second receiving beam of the second antenna group 114. The reference ratio calculator 132c may also measure or obtain power of a comparison signal received through the first receiving beam having the reference pattern and power of a comparison signal received through the second receiving beam having the reference pattern and calculate the reference ratio using the measured or obtained power.

The power estimator 132d according to an example embodiment may estimate power of third signals that are expected to be received through the first antenna group 112 when the first receiving beam is swept to have patterns other than the first patterns of the plurality of patterns by using the actually measured power of the second signals and the reference ratio. The power estimator 132d may also estimate power of fourth signals that are expected to be received through the second antenna group 114 when the second receiving beam is swept to have patterns other than the second patterns of the plurality of patterns by using the actually measured power of the first signals and the reference ratio.

The beam pattern selector 132e according to an example embodiment may use the actually measured power of the first signals, the actually measured power of the second signals, the estimated power of the third signals, and the estimated power of the fourth signals to select at least one of the first patterns and the second patterns as a receiving beam pattern. An embodiment of selection of the receiving beam pattern will be described in detail with reference to FIGS. 12A and 12B.

Figure 4:
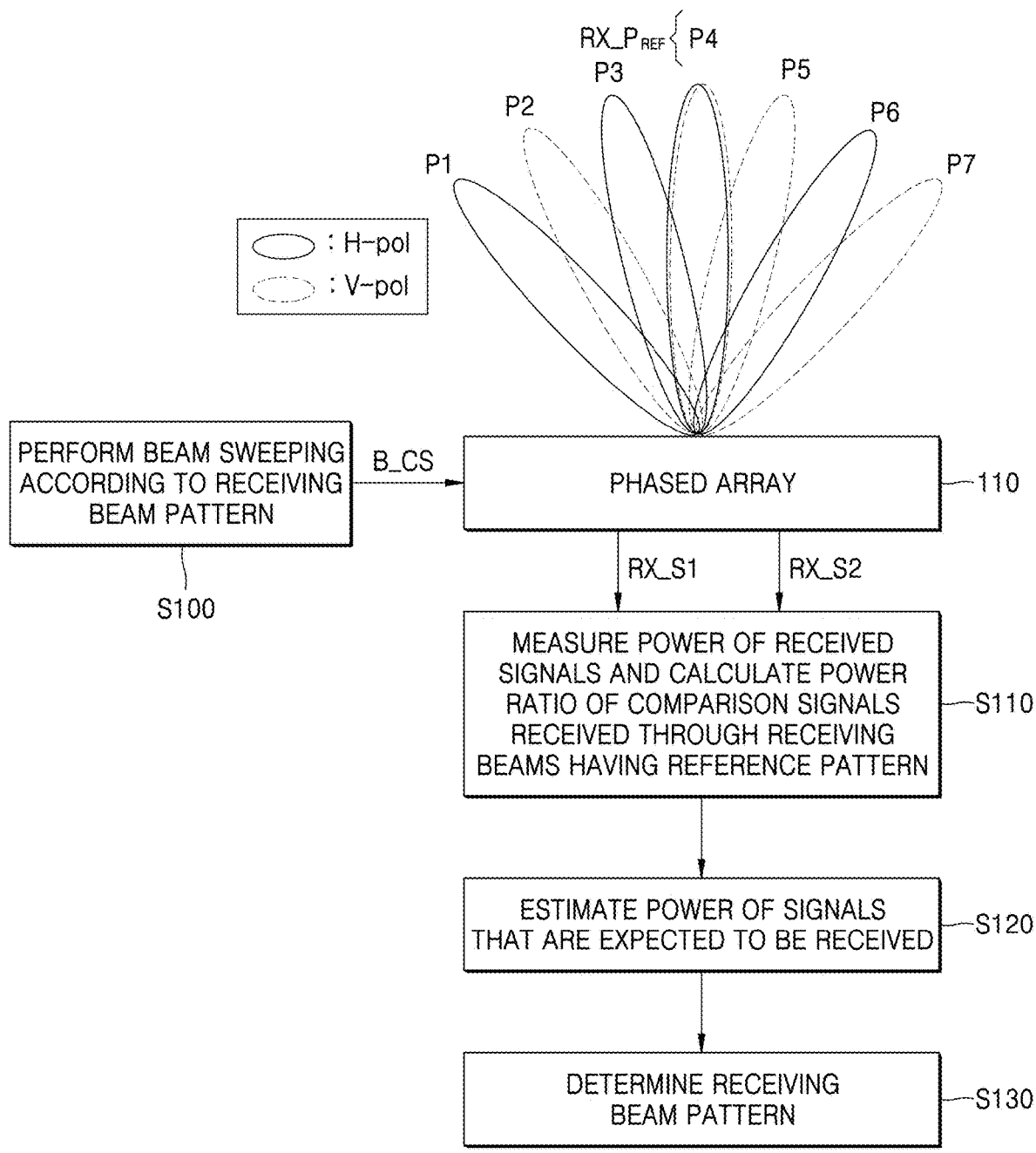
FIG. 4 is a diagram illustrating a method, performed by a processor of FIG. 2, of determining a receiving beam pattern according to an example embodiment.

FIG. 4 is a diagram illustrating a method of determining a receiving beam pattern of the processor 130 of FIG. 2 according to an example embodiment. Hereinafter, for convenience of description, it is described assuming that a plurality of patterns include a pattern 'P1' to a pattern 'P7', but this is merely an example embodiment, and the example embodiments of the inventive concepts are not limited thereto.

Referring to FIGS. 2 and 4, the processor 130 may perform a beam sweeping operation according to receiving beam patterns by providing the beam control signal B_CS to the phased array 110 (operation S100). As an example, the processor 130 may use the first antenna group 112 to form a first receiving beam having first patterns and polarized in a horizontal direction H-pol and use the second antenna group 114 to form a second receiving beam having second patterns and polarized in a vertical direction V-pol. Hereinafter, the first patterns may include patterns 'P1', 'P3', 'P4', and 'P6', the second patterns may include patterns 'P2', 'P4', T5', and T7', and the pattern 'P4', which is a common pattern of the first patterns P1, P3, P4 and P6 and the second patterns P2, P4, P5 and P7, may be previously set as a reference pattern $RX\_P_{REF}$.

The processor 130 may measure power of first signals RX_S1 and power of second signals RX_S2 received through operation S100 and calculate a power ratio of comparison signals received through receiving beams having the reference pattern $RX\_P_{REF}$ (operation S110). Specifically, the processor 130 may calculate a ratio between power of a first comparison signal received through the first receiving beam having the pattern 'P4' and power of a second comparison signal received through the second receiving beam having the pattern 'P4' as a reference ratio. According to some example embodiments, the processor 130 may obtain the power of the first comparison signal and the power of the second comparison signal from the power of first signals RX_S1 and the power of second signals RX_S2 actually measured in operation S110.

The processor 130 may estimate power of signals that are expected to be received through the phased array 110 using the actually measured power of the first signals RX_S1 and the second signals RX_S2 and the reference ratio (operation S120). Specifically, the processor 130 may estimate power of third signals that are expected to be received through the first antenna group 112 when the first receiving beam is swept to have the patterns P2, P5, and P7 other than the first patterns P1, P3, P4, and P6 and may estimate power of fourth signals that are expected to be received through the second antenna group 114 when the second receiving beam is swept to have the patterns P1, P3, and P6 other than the first patterns P2, P3, P5, and P7.

The processor 130 may perform operations S100, S120, and S130 for a desired (or, alternatively, a predetermined) interval a plurality of times and may determine the receiving beam pattern using the power of the first signals RX_S1, the power of the second signals RX_S2, the power of the third signals, and the power of the fourth signals that are generated as a result of performing the operations (operation S130). The processor 130 may determine a cell candidate group from a plurality of cells based on the power of the signals, determine a valid cell from the cell candidate group, and select at least one pattern corresponding to the valid cell as the receiving beam pattern.

Figure 5:
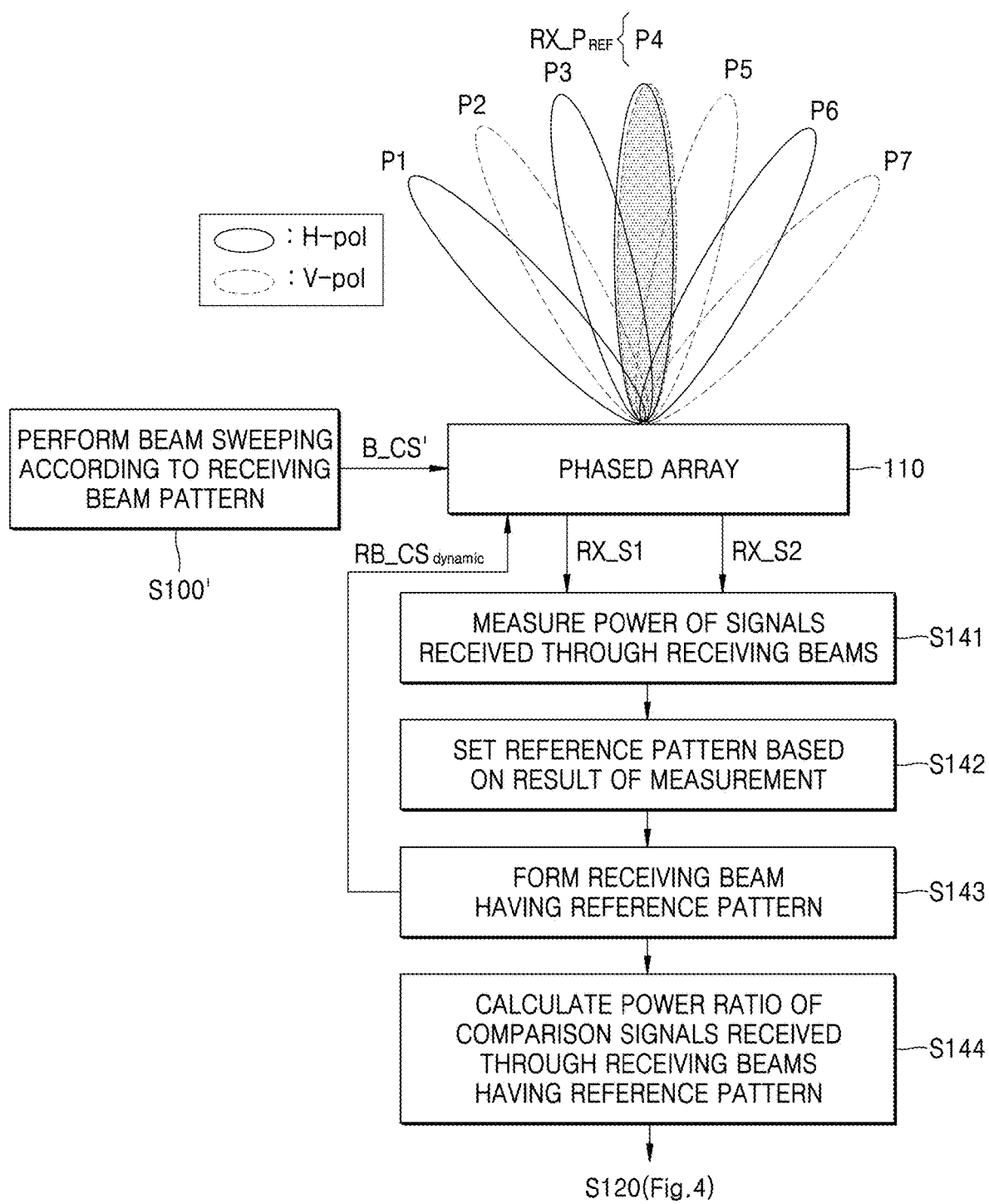
FIG. 5 is a diagram illustrating a method, performed by a processor of FIG. 2, of setting a reference pattern, according to an example embodiment.

FIG. 5 is a diagram illustrating a method, performed by the processor 130 of FIG. 2, of setting a reference pattern according to an example embodiment.

Referring to FIGS. 2 and 5, the processor 130 may perform a beam sweeping operation according to receiving beam patterns by providing a beam control signal B_CS' to the phased array 110 (operation S100'). As an example, the processor 130 may use the first antenna group 112 to form a first receiving beam having first patterns and polarized in the horizontal direction H-pol and use the second antenna group 114 to form a second receiving beam having second patterns and polarized in the vertical direction V-pol. Hereinafter, the first patterns may include patterns 'P1', 'P3', 'P4', and 'P6', the second patterns may include patterns 'P2', 'P5', and 'P7', and the first patterns P1, P3, P4 and P6 and the second patterns P2, P5, and P7 may not have a common pattern.

The processor 130 may measure power of the first signals RX_S1 and power of the second signals RX_S2 received through operation S100'.

The processor 130 may dynamically set the reference pattern $RX\_P_{REF}$ based on a result of measuring the power of the first signals RX_S1 and the power of the second signals RX_S2 (operation S142). For example, the processor 130 may set the pattern 'P4' as the reference pattern $RX\_P_{REF}$ when the power of the first signal RX_S1 having the pattern 'P4' satisfies a specific condition. The specific condition may be variously set such that power of a predetermined signal is equal to or higher than a reference value, or corresponds to power having the largest value among measured power of signals.

The processor 130 may additionally form a receiving beam (an oblique area) having the reference pattern $RX\_P_{REF}$ (operation S143). Specifically, the processor 130 may provide a reference beam control signal $RB\_CS_{dynamic}$ to the second antenna group 114 to form the second receiving beam (the oblique area) having the pattern 'P4'. The processor 130 may additionally receive the second signal RX_S2 through the second receiving beam (the oblique area) having the pattern 'P4' and may measure power of the received second signal RX_S2. The processor 130 may calculate a power ratio of comparison signals received through receiving beams having the reference pattern $RX\_P_{REF}$ (operation S144). For example, the processor 130 may calculate a ratio between power of a first comparison signal received through the first receiving beam having the pattern 'P4' and power of a second comparison signal received through the second receiving beam having the pattern 'P4' as a reference ratio. Thereafter, the processor 130 may subsequently perform operation S120 of FIG. 4.

As described above, the wireless communication device 100 according to an example embodiment may set an optimal reference pattern matching a channel environment by dynamically setting a reference pattern based on actually measured power of signals, thereby further improving an effect according to the example embodiments.

Figure 6:
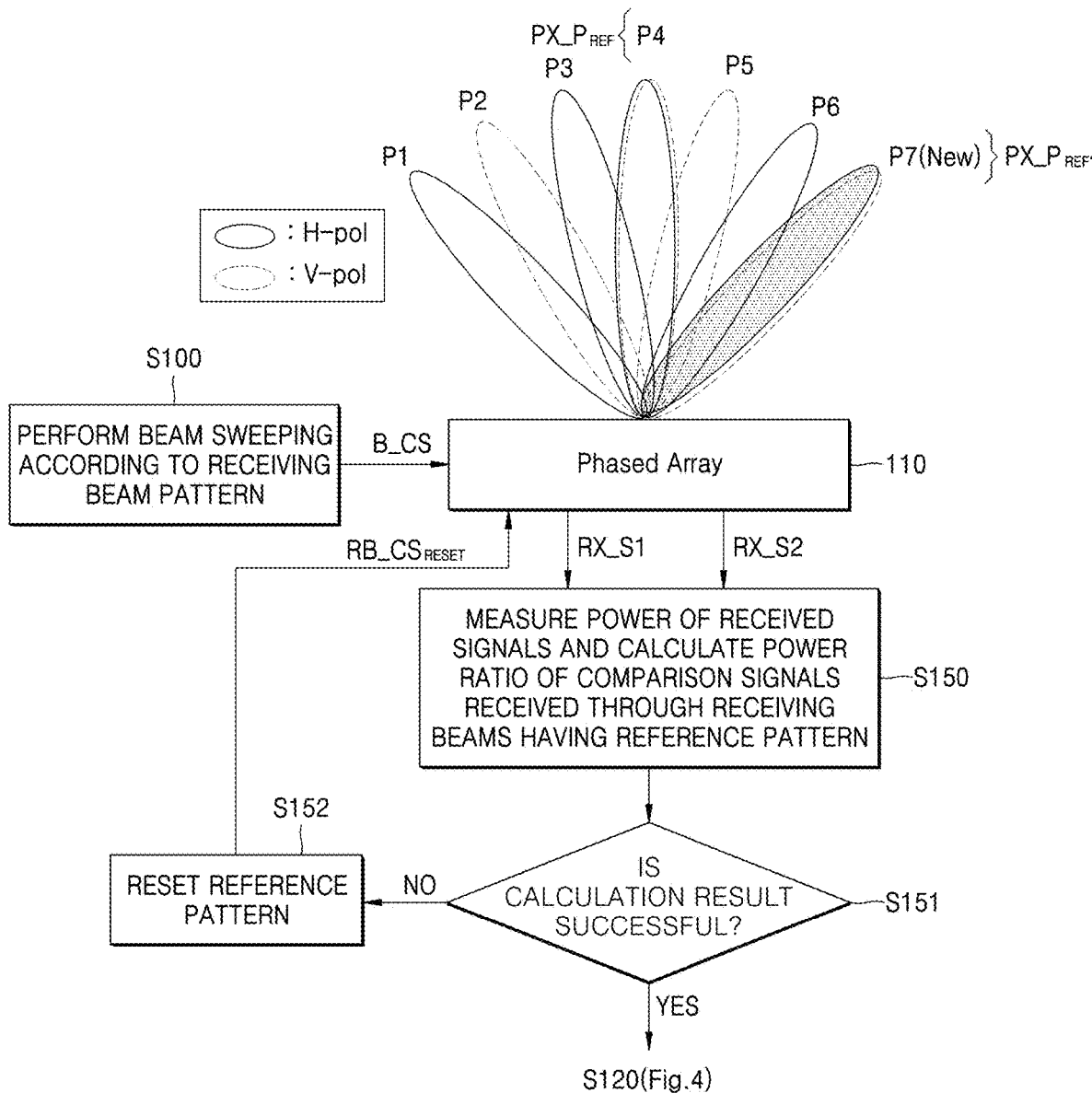
FIG. 6 is a diagram illustrating a method, performed by a processor of FIG. 2, of resetting a reference pattern, according to an example embodiment.

FIG. 6 is a diagram illustrating a method, performed by the processor 130 of FIG. 2, of resetting a reference pattern according to an example embodiment.

Referring to FIGS. 2 and 6, the processor 130 may perform a beam sweeping operation according to receiving beam patterns by providing the beam control signal B_CS to the phased array 110 (operation S100). As an example, the processor 130 may use the first antenna group 112 to form a first receiving beam having first patterns and polarized in the horizontal direction H-pol and use the second antenna group 114 to form a second receiving beam having second patterns and polarized in the vertical direction V-pol. Hereinafter, the first patterns may include the patterns 'P1', 'P3', 'P4', and 'P6', the second patterns may include patterns 'P2', 'P4', T5', and T7', and the pattern 'P4', which is a common pattern of the first patterns P1, P3, P4 and P6 and the second patterns P2, P4, P5 and P7, may be previously set as the reference pattern $RX\_P_{REF}$.

The processor 130 may measure power of first signals RX_S1 and power of second signals RX_S2 received through operation S100 and calculate a power ratio of comparison signals received through receiving beams having the reference pattern $RX\_P_{REF}$ (operation S110).

The processor 130 may determine whether a calculation result of the power ratio of the comparison signals succeeds (operation S151). When it is determined that the calculation result of the power ratio of the comparison signals fails (operation S151, No), for example, when a ratio between power of a first comparison signal received through a first receiving beam having the pattern 'P4' and power of a second comparison signal received through a second receiving beam having the pattern 'P4' is outside a reference range, the processor 130 may determine that operation S151 fails and reset the reference pattern RX_P$_{REF}$ (operation S152). The reference range may be set to determine whether the calculation result is reliable. Because a correct estimation operation may not be performed using the calculation result that goes beyond the reference range, the processor 130 may reset the reference pattern RX_P$_{REF}$. For example, the processor 130 may reset the pattern 'P7' as a reference pattern RX_P$_{REF}$'.

The processor 130 may additionally form a receiving beam (an oblique area) having the reference pattern RX_P$_{REF}$'. Specifically, the processor 130 may provide a reset reference beam control signal RB_CS$_{RESET}$ to the first antenna group 112 to form a first receiving beam (the oblique area) having the pattern 'P7'. The processor 130 may additionally receive the second signal RX_S2 through a first receiving beam (the oblique area) having the pattern 'P7', measure the power of the received second signal RX_S2, and subsequently perform a part of operation S151 and operation S151.

Otherwise, when it is determined that the calculation result of the power ratio of the comparison signals is successful (operation S151, Yes), for example, when the ratio between the power of the first comparison signal received through the first receiving beam having the pattern 'P4' and the power of the second comparison signal received through the second receiving beam having the pattern 'P4' is within the reference range, the processor 130 may subsequently perform operation S120 (FIG. 4).

As such, the wireless communication device 100 according to an example embodiment may ensure communication performance according to example embodiments of the inventive concepts by resetting a reference pattern depending on circumstances.

Figure 7A:
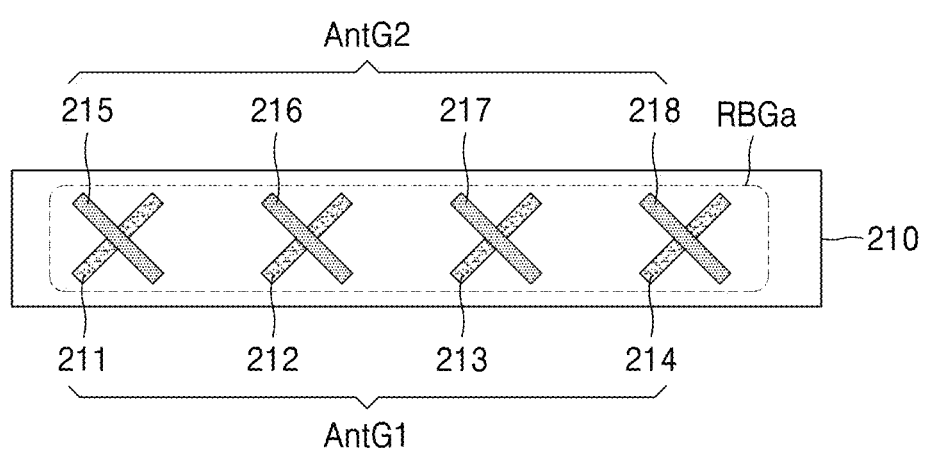
FIGS. 7A and 7B are diagrams illustrating a method of forming a receiving beam having a reference pattern, according to example embodiments.
Figure 7B:
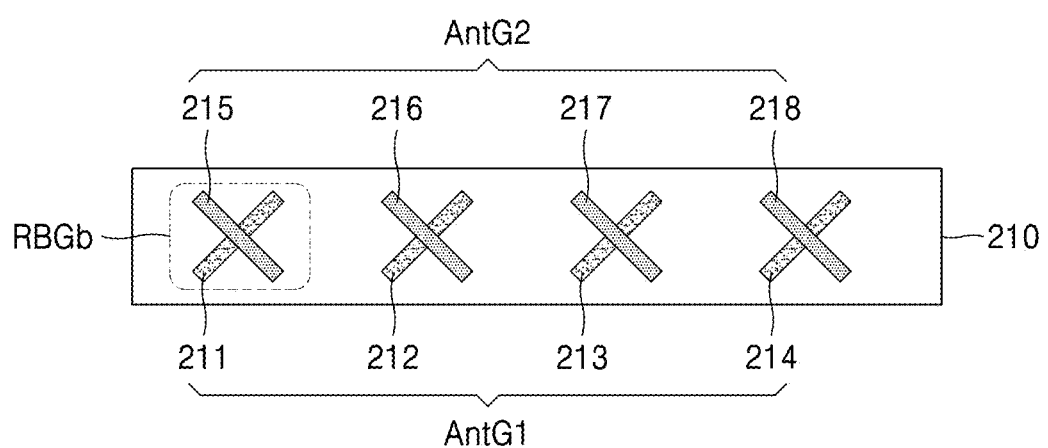

FIGS. 7A and 7B are diagrams illustrating a method of forming a receiving beam having a reference pattern, according to example embodiments.

Referring to FIG. 7A, a phased array 210 may include a first antenna group AntG1 and a second antenna group AntG2. The first antenna group AntG1 may include a plurality of antennas 211 to 214 for receiving signals polarized in a first direction (e.g., a horizontal direction). The second antenna group AntG2 may include a plurality of antennas 215 to 218 for receiving signals polarized in a second direction (e.g., a vertical direction).

The first antenna group AntG1 may form a first receiving beam having first patterns by using all of the antennas 211 to 214 in a beam sweeping operation and the second antenna group AntG2 may form a second receiving beam having second patterns by using all of the antennas 215 to 218 in the beam sweeping operation.

Further, the antennas 211 to 214 and 215 to 218 used for forming the first receiving beam or the second receiving beam having the first patterns or the second patterns may be used to form a receiving beam having a reference pattern. A group of the antennas 211 to 214 and 215 to 218 used to form the receiving beam having the reference pattern may be referred to as a reference beam antenna group RBGa. The reference beam antenna group RBGa according to an example embodiment may include the antennas 211 to 214 of the first antenna group AntG1 and the antennas 215 to 218 of the second antenna group AntG2.

Referring to FIG. 7B, unlike FIG. 7A, only some of the antennas 211 to 214 and 215 to 218 used for forming the first receiving beam or the second receiving beam having the first patterns or the second patterns may be used to form the receiving beam having the reference pattern. A reference beam antenna group RBGb according to an example embodiment may include the antenna 211 of the first antenna group AntG1 and the antenna 215 of the second antenna group AntG2. However, this is merely an example and the inventive concepts are not limited thereto, and the reference beam antenna group RBGb may include three or less antennas of the antennas 211 to 214 of the first antenna group AntG1 and three or less antennas of the antennas 215 to 218 of the second antenna group AntG2.

The number of antennas of the first antenna group AntG1 and the number of antennas of the second antenna group AntG2 shown in FIGS. 7A and 7B are merely examples, the inventive concepts are not limited thereto, and each of the first antenna group AntG1 and the second antenna group AntG2 may include four or more antennas or four or less antennas.

Figure 8:
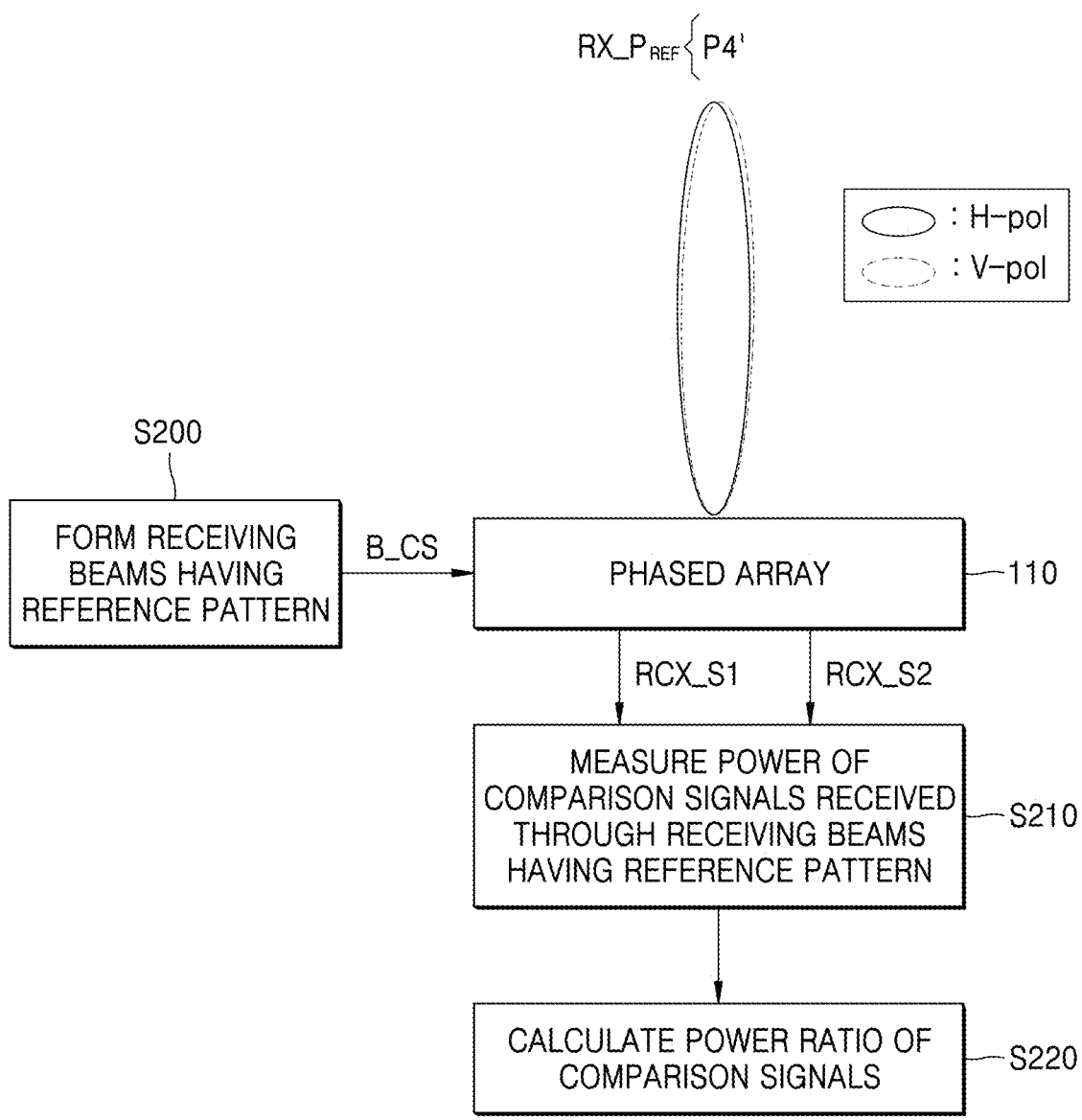
FIG. 8 is a diagram illustrating a method, performed by a processor of FIG. 2, of calculating a reference ratio, according to an example embodiment.

FIG. 8 is a diagram of a method, performed by the processor 130 of FIG. 2, of calculating a reference ratio according to an example embodiment.

Referring to FIGS. 2 and 8, the processor 130 may perform a beam sweeping operation using the phased array 110 before performing the beam sweeping operation, and then form receiving beams having the reference pattern RX_P$_{REF}$ (operation S200). That is, operation S200 may precede or follow the beam sweeping operation. Specifically, the processor 130 may provide the reference beam control signal RB_CS to the phased array 110 such that receiving beams having the reference pattern RX_P$_{REF}$ may be formed using a method shown in FIG. 7B. For example, the reference pattern RX_P$_{REF}$ may be set as a pattern 'P4'' and the processor 130 may use some of antennas of the first antenna group 112 to form a first receiving beam having the pattern 'P4'' and use some of antennas of the second antenna group 114 to form a second receiving beam having the pattern 'P4''.

The processor 130 may receive comparison signals RCX_S1 and RCX_S2 received through the receiving beams having the reference pattern RX_P$_{REF}$ and measure power of the received comparison signals RCX_S1 and RCX_S2 (operation S210). The processor 130 may calculate a power ratio of the comparison signals RCX_S1 and RCX_S2 as a reference ratio (operation S220). The processor 130 may use the reference ratio to estimate power of receivable signals according to example embodiments.

Figure 9:
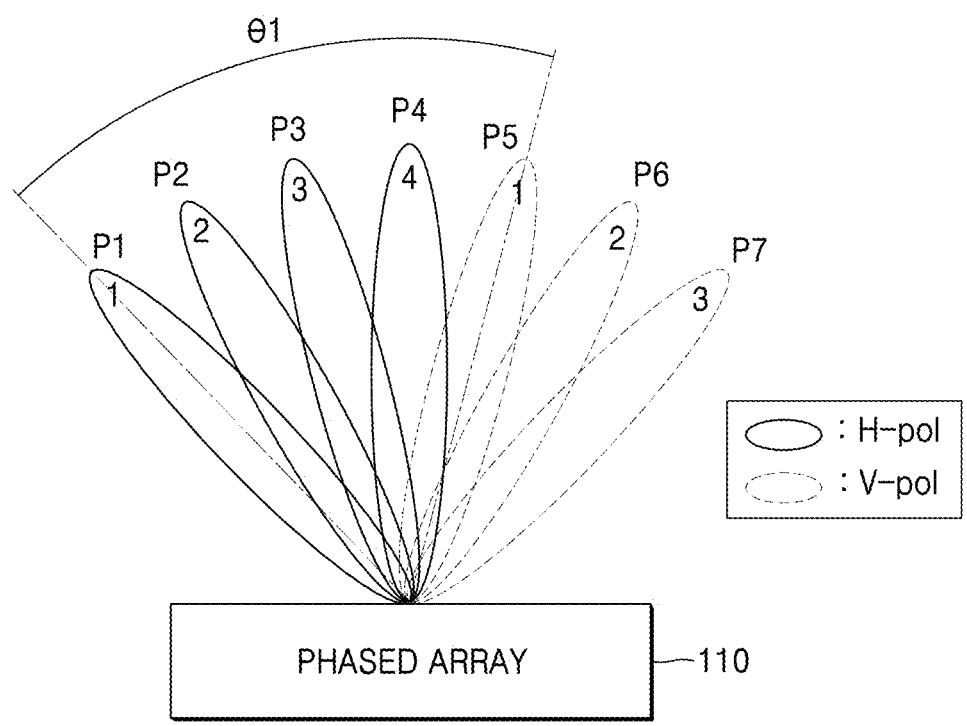
FIGS. 9 and 10 are diagrams of a beam sweeping operation of a processor of FIG. 2, according to an example embodiment.
Figure 10:
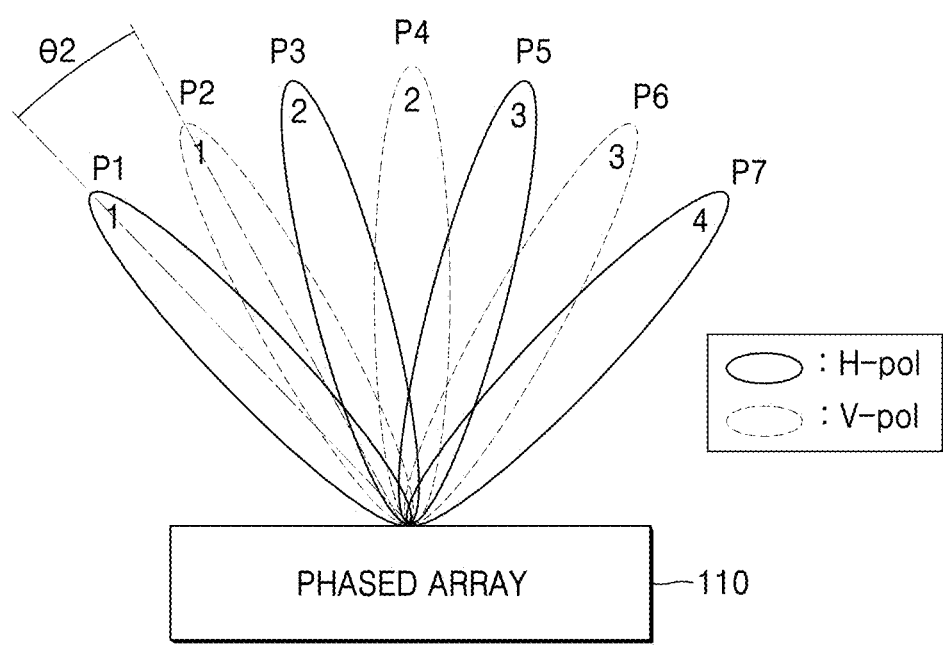

FIGS. 9 and 10 are diagrams of a beam sweeping operation of the processor 130 of FIG. 2, according to an example embodiment.

Referring to FIGS. 2 and 9, the processor 130 may perform the beam sweeping operation using the first antenna group 112 and the beam sweeping operation using the second antenna group 114 in parallel. The processor 130 may set first patterns of a first receiving beam formed in the first antenna group 112 to include the patterns 'P1', 'P2', 'P3', and 'P4' and second patterns of a second receiving beam formed in the second antenna group 114 to include the patterns 'P5', 'P6', and 'P7'.

The processor 130 according to an example embodiment may control beam sweeping in a predetermined order such that an angle θ1 between a first receiving beam and a second receiving beam formed simultaneously is equal to or greater than a first reference value. For example, the phase array 110 may form the first receiving beam having the pattern 'P1' by the processor 130, at this time, form the second receiving beam having the pattern 'P5', subsequently, form the first receiving beam having the pattern 'P2', at this time, form the second receiving beam having the pattern 'P6', subsequently, form the first receiving beam having the pattern 'P3', at this time, form the second receiving beam having the pattern 'P7', and subsequently, form the first receiving beam having the pattern 'P4'.

That is, the processor 130 may set the first patterns and the second patterns such that the angle θ1 between the first receiving beam and the second receiving beam formed simultaneously is equal to or greater than the first reference value, and control the beam sweeping operation such that correlation between the first receiving beam and the second receiving beam may be less than the reference value during the beam sweeping operation. By reducing the correlation between the first receiving beam and the second receiving beam, an error probability due to polarization leakage may be reduced, thereby further improving the effect according to example embodiments of the inventive concept.

Referring to FIG. 10, the processor 130 may set the first patterns of the first receiving beam formed in the first antenna group 112 to include the patterns 'P1', 'P3', 'P5', and 'P7' and the second patterns of the second receiving beam formed in the second antenna group 114 to include the patterns 'P2', 'P4', and 'P6'.

The processor 130 according to an example embodiment may control beam sweeping in a predetermined order such that an angle θ2 between the first receiving beam and the second receiving beam formed simultaneously is equal to or less than a second reference value. For example, the phase array 110 may form the first receiving beam having the pattern 'P1' by the processor 130, at this time, form the second receiving beam having the pattern 'P2', subsequently, form the first receiving beam having the pattern 'P3', at this time, form the second receiving beam having the pattern 'P4', subsequently, form the first receiving beam having the pattern 'P5', at this time, form the second receiving beam having the pattern 'P6', and subsequently, form the first receiving beam having the pattern 'P7'.

That is, the processor 130 may set the first patterns and the second patterns such that the angle θ2 between the first receiving beam and the second receiving beam formed simultaneously is equal to or less than the second reference value, and control the beam sweeping operation, thereby complementing a poor channel environment experienced by a signal in a specific polarization direction such that accuracy of a power estimation operation according to example embodiments of the inventive concepts may be more than a reference value.

Figure 11:
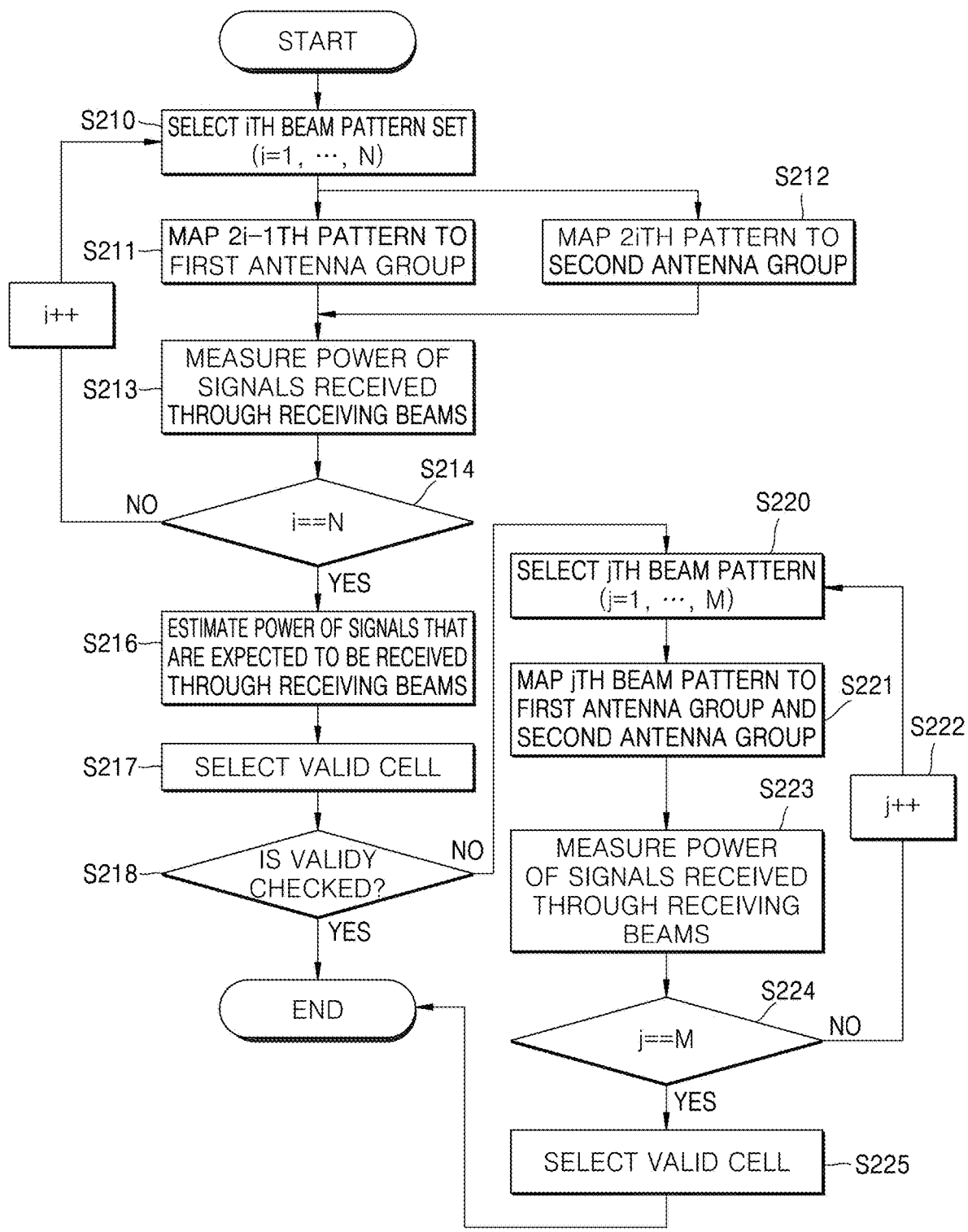
FIG. 11 is a flowchart of a cell search method of a wireless communication device, according to an example embodiment.

FIG. 11 is a flowchart of a cell search method of a wireless communication device according to an example embodiment.

Referring to FIG. 11, the wireless communication device may select a beam pattern set from a plurality of patterns (operation S210). A beam pattern set may include a pattern mapped to a first antenna group of a phased array and a pattern mapped to a second antenna group of the phased array among the plurality of patterns that may be formed by the wireless communication device through the phased array. For example, an ith (i is an integer equal to or greater than 1) beam pattern set may include a 2i−1th pattern and a 2ith pattern. Hereinafter, it is assumed that there are N (where N is an integer of 1 or more) beam pattern sets.

The wireless communication device may map the 2i−1th pattern to a first antenna group (operation S211) and map the 2ith pattern to a second antenna group (operation S212). The wireless communication device may measure power of signals received through receiving beams formed in the first antenna group and the second antenna group (operation S213). The wireless communication device may determine whether 'i' is 'N' (operation S214), when the 'i' is not 'N' (operation S214, No), count up 'i' (operation S215), and subsequently perform operation S210. The wireless communication device may estimate power of signals that are expected to be received through the receiving beams when 'i' is 'N' (operation S214, Yes) (operation S216). That is, the wireless communication device may estimate power of signals that are expected to be received when the first receiving beam formed in the first antenna group has the 2ith patterns in a beam sweeping operation including operations S210, S211, and S212. Further, in the beam sweeping operation, the wireless communication device may estimate power of signals that are expected to be received when the second receiving beam formed in the second antenna group has the 2i−1th patterns in the beam sweeping operation.

Operation S216 may further include an operation of the wireless communication device for analyzing relationship between a channel corresponding to the first receiving beam and a channel corresponding to the second receiving beam, and the wireless communication device may perform operation S216 based on an analysis result.

The wireless communication device may determine a cell candidate group including cells that are likely to be selected as valid cells from among a plurality of cells using the power of the signals measured in operation S213 and powers of the signals estimated in operation S216, and select a cell having the highest reliability among the cell candidate group as the valid cell (operation S217). Specifically, the wireless communication device may determine cells corresponding respectively to signals having power equal to or greater than a first threshold from the power of the signals as the cell candidate group. The wireless communication device may select the valid cell from the cell candidate group through various methods such as a method of measuring a correlation between signals received through optimal receiving beams of respective cells from the cells of the cell candidate group and a reference signal (or a synchronization signal). The optimal receiving beams may include the first receiving beam and the second receiving beam having a pattern in which the wireless communication device measures or estimates a signal received from a cell having the highest power.

The wireless communication device may check validity of the selected valid cell (operation S218). That is, because operation S216 is included in a cell search operation according to example embodiments, the reliability of the cell search operation may be improved by checking the validity of the selected valid cell. In an example embodiment, the wireless communication device may check the validity by determining whether a specific value (e.g., a correlation) that is a basis for selection of the valid cell exceeds a second threshold value or a difference between specific values of cells other than the valid cell of the cell candidate group and a specific value of the valid cell exceeds a third threshold value. For example, the wireless communication device may determine that the valid cell is valid when the specific value of the valid cell exceeds the second threshold value or the difference between the specific value of the valid cell and the specific values of the other cells exceeds the third threshold value.

The wireless communication device may decode a signal (for example, a physical broadcast channel (PBCH)) received from the valid cell when the selected valid cell is valid (operation S218, Yes), and perform wireless communication with the valid cell by selecting patterns corresponding to the optimal receiving beams of the valid cell as a receiving beam pattern when decoding is successful.

When the selected valid cell is invalid (operation S218, No), the wireless communication device may select a j-th beam pattern from among a plurality of patterns (operation S220). The wireless communication device may map the j-th beam pattern to each of the first antenna group and the second antenna group of the phased array (operation S221). The wireless communication device may measure power of the signals received through the receiving beams formed in the first antenna group and the second antenna group (operation S223). The wireless communication device may determine whether 'j' is 'M' (operation S224), when the 'j' is not 'N' (operation S224, No), count up 'j' (operation S222), and subsequently perform operation S220. When the 'j' is 'N' (operation S224, Yes), the wireless communication device may determine a cell candidate group including cells that are likely to be selected as valid cells from among a plurality of cells using the power of the signals measured in operation S223, and select a cell having the highest reliability among the cell candidate group as the valid cell (operation S225). Thereafter, the wireless communication device may decode a signal (for example, the PBCH) received from the selected valid cell and perform wireless communication with the valid cell by selecting patterns corresponding to the valid cell as the receiving beam pattern when decoding is successful.

Figure 12A:
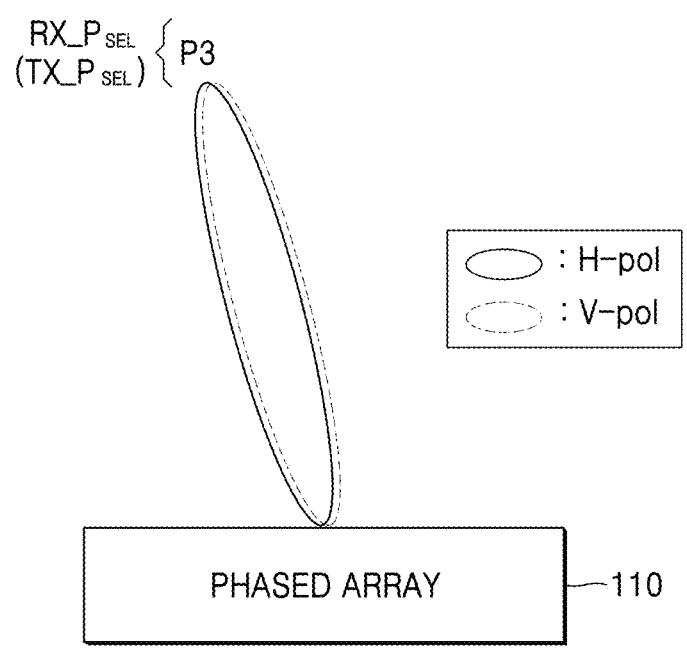
FIGS. 12A and 12B are diagrams of a method, performed by a processor of FIG. 2, of selecting a receiving beam pattern, according to example embodiments.
Figure 12B:
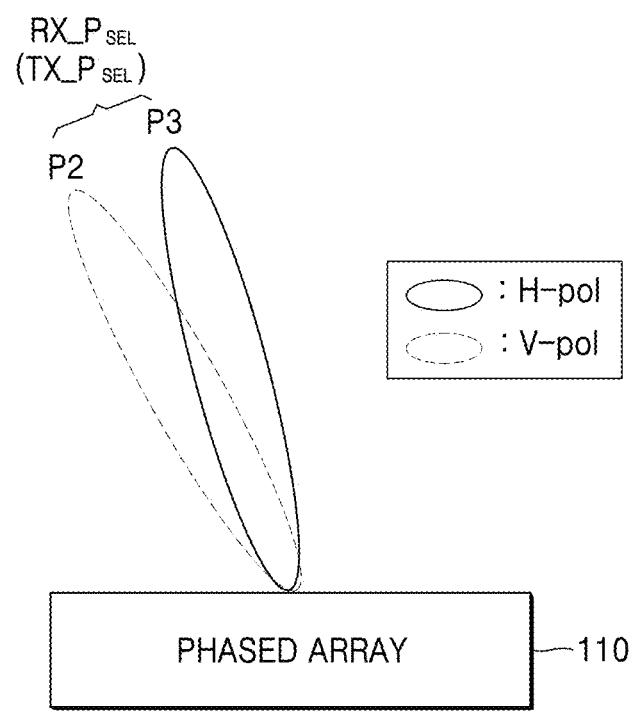

FIGS. 12A and 12B are diagrams of a method, performed by the processor 130 of FIG. 2, of selecting a receiving beam pattern according to example embodiments. Hereinafter, for the sake of convenience, it is assumed that a receiving beam pattern is selected with respect to the optimal receiving beams of a valid cell, and it is apparent that such a method may also be applied to selecting the receiving beam pattern with respect to the optimal receiving beams of other cells.

Referring to FIGS. 2 and 12A, the processor 130 may control a first receiving beam and a second receiving beam to have the same receiving beam pattern. As described above, the processor 130 may perform a beam sweeping operation to receive first and second signals from the valid, respectively, cell through the first receiving beam and the second receiving beam, measure power of the first signals and power of the second signals, and estimate power of third and fourth signals receivable through the first receiving beam and the second receiving beam.

In an example embodiment, the processor 130 may sum power corresponding to the same pattern from the actually measured power of the first signals and the estimated power of the fourth signals, respectively, and sum power corresponding to the same pattern from the actually measured power of the second signals and the estimated power of the third signals, respectively. The processor 130 may select a pattern with the highest summation power as the receiving beam pattern based on a summed result. For example, the processor 130 may select the pattern 'P3' as a receiving beam pattern $RX\_P_{SEL}$, whereby the processor 130 may provide the beam control signal B_CS to each of the first antenna group 112 and the second antenna group 114 to control the phased array 110 such that the first receiving beam and the second receiving beam each having the pattern 'P3' are formed. Thereafter, the wireless communication device 100 may receive a data signal from the valid cell through the first receiving beam and the second receiving beam each having the pattern 'P3', and further, may select the pattern 'P3' as a transmitting beam pattern $TX\_P_{SEL}$ and transmit the data signal to the valid cell through the first receiving beam and the second receiving beam each having the pattern 'P3'.

Referring to FIG. 12B, the processor 130 may control the first receiving beam and the second receiving beam to have different receiving beam patterns, unlike in FIG. 12A. The processor 130 may determine a pattern corresponding to a signal having the largest power as the receiving beam pattern of the first receiving beam based on the actually measured power of the first signals and the estimated power of the fourth signals, and determine a pattern corresponding to a signal having the largest power as the receiving beam pattern of the second receiving beam based on the actually measured power of the second signals and the estimated power of the fourth signals. For example, the processor 130 may select the pattern 'P3' as the receiving beam pattern $RX\_P_{SEL}$ of the first receiving beam and the pattern 'P2' as the receiving beam pattern $RX\_P_{SEL}$ of the second receiving beam. Accordingly, the processor 130 may provide the beam control signal B_CS to each of the first antenna group 112 and the second antenna group 114 to control the phased array 110 such that the first receiving beam and the second receiving beam respectively having the pattern 'P3' and the pattern 'P2' are formed. Thereafter, the wireless communication device 100 may receive a data signal from the valid cell through the first receiving beam and the second receiving beam respectively having the pattern 'P3' and the pattern 'P2', and further, may select the pattern 'P3' and the pattern 'P2' as the transmitting beam pattern $TX\_P_{SEL}$ and transmit the data signal to the valid cell through the first receiving beam and the second receiving beam respectively having the pattern 'P3' and the pattern 'P2'.

Figure 13:
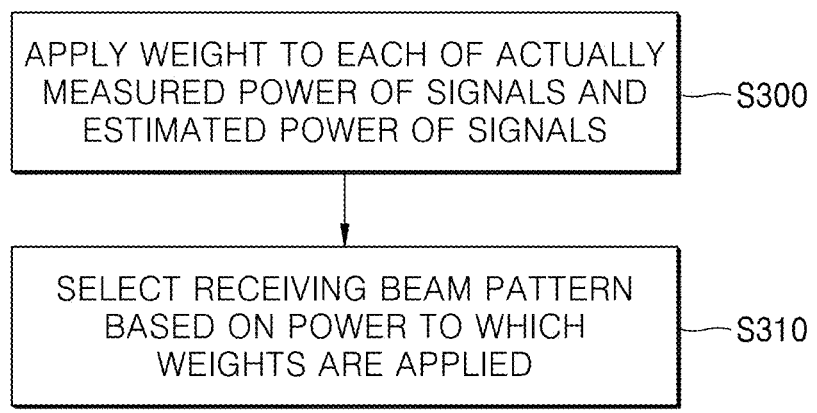
FIG. 13 is a flowchart illustrating a method, performed by a processor of FIG. 2, of selecting a receiving beam pattern, according to an example embodiment.

FIG. 13 is a flowchart illustrating a method, performed by the processor 130 of FIG. 2, of selecting a receiving beam pattern according to an example embodiment.

Referring to FIGS. 2 and 13, the processor 130 may apply a weight to each of actually measured power of signals and estimated power of the signals (operation S300). For example, the processor 130 may apply different weights to the actually measured power of signals and the estimated power of the signals in consideration of a communication environment between the wireless communication device 100 and cells. The weight may be obtained from a look-up table stored in a memory (not shown) of the wireless communication device 100, or may be obtained from a machine learning model applied to the wireless communication device 100.

The processor 130 may select the receiving beam pattern based on the power to which the weights are applied (operation S310). That is, the processor 130 may select the receiving beam pattern according to the example embodiments described with reference to FIGS. 12A and 12B based on the power to which the weights are applied.

Figure 14:
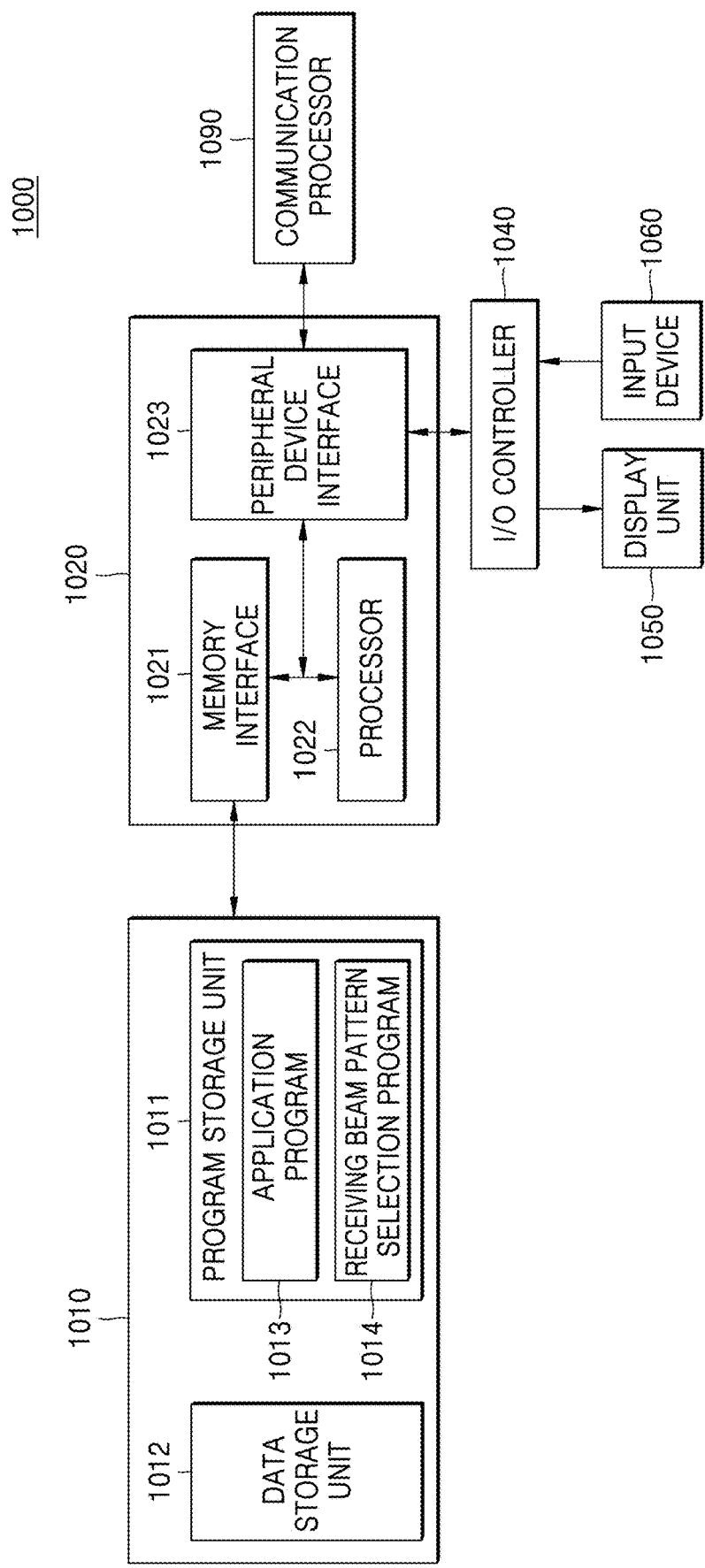
FIG. 14 is a block diagram of an electronic device according to an example embodiment.

FIG. 14 is a block diagram of an electronic device 1000 according to an example embodiment.

Referring to FIG. 14, the electronic device 1000 may include a memory 1010, a processor unit 1020, an input/output (I/O) controller 1040, a display unit 1050, an input device 1060, and a communication processor 1090. Here, the electronic device 1000 may include a plurality of memories 1010. Each component of the electronic device 1000 will now be described.

The memory 1010 may include a program storage unit 1011 configured to store a program for controlling an operation of the electronic device 1000 and a data storage unit 1012 configured to store data generated during the program. The data storage unit 1012 may store data required for operations of an application program 1013 and a receiving beam pattern selection program 1014. The program storage unit 1011 may include an application program 1013 and a receiving beam pattern selection program 1014. Here, the program included in the program storage unit 1011 may be expressed as an instruction set, which is a set of instructions.

The application program 1013 may include an application program, which operates in the electronic device 1000. That is, the application program 1013 may include an instruction of an application that is driven by a processor 1022. The receiving beam pattern selection program 1014 may perform a series of processes such as a beam sweeping operation on selected some patterns of a plurality of patterns using receiving beams having different polarization directions, a channel relation analysis between signals having different polarization directions, a power estimation of signals that are expected to be received, etc. according to example embodiments.

A peripheral device interface 1023 may control the connection of an I/O peripheral device of a base station with the processor 1022 and a memory interface 1021. The processor 1022 may control the base station to provide a service corresponding thereto by using at least one software program. At this time, the processor 1022 may execute at least one program stored in the memory 1010 and provide the corresponding service to the executed program.

The I/O controller 1040 may interface between an I/O device (e.g., the display unit 1050 and the input device 1060) and the peripheral device interface 1023. The display unit 1050 may display state information, input characters, moving pictures, and still pictures. For example, the display unit 1050 may display information of an applied program, which is driven by the processor 1022.

The input device 1060 may provide input data, which is generated by the selection of the electronic device 1000, through the I/O controller 1040 to the processor unit 1020. At this time, the input device 1060 may include a keypad including at least one hardware button, a touch pad configured to sense touch information, etc. For example, the input device 1060 may provide touch information (e.g., touch, touch movement, and touch release), which is sensed through the touch pad, to the processor 1022 through the I/O controller 1040. The electronic device 1000 may include the communication processor 1090 that performs communication functions for voice communication and data communication. The communication processor 1090 may include at least one phased array and the fast beam selection program 1014 may control the communication processor 1090 when performing operations such as the beam sweeping operation, a receiving beam selection operation, a cell search, etc. according to example embodiments.

While the inventive concepts has been particularly shown and described with reference to embodiments thereof, it will be understood that various changes in form and details may be made therein without departing from the spirit and scope of the following claims.

What is claimed is:

1. A method of operating a wireless communication device including a phased array, the phased array including a first antenna group and a second antenna group, the method comprising:

receiving first signals polarized in a first direction by sweeping a first receiving beam formed in the first antenna group to have first patterns of a plurality of patterns;

receiving second signals polarized in a second direction by sweeping a second receiving beam formed in the second antenna group to have second patterns of the plurality of patterns;

measuring power of the first signals and power of the second signals;

analyzing a relationship between a channel corresponding to the first receiving beam and a channel corresponding to the second receiving beam;

estimating, based on the relationship, power of third signals expected to be received through the first antenna group when the first receiving beam is swept to have patterns other than the first patterns of the plurality of patterns and power of fourth signals that are expected to be received through the second antenna group when the second receiving beam is swept to have patterns other than the second patterns of the plurality of patterns; and selecting a receiving beam pattern based on the power of the first signals, the power of the second signals, the power of the third signals, and the power of the fourth signals.

2. The method of claim 1, wherein the analyzing of the relationship comprises:

calculating a ratio between power of a first comparison signal received through the first receiving beam having a reference pattern among the first patterns and power of a second comparison signal received through the second receiving beam having the reference pattern among the second patterns.

3. The method of claim 2, wherein the estimating of the power of the third signals and the power of the fourth signals comprises:

calculating the power of the third signals and the power of the fourth signals by applying the ratio to the power of the first signals and the power of the second signals.

4. The method of claim 1, wherein the analyzing of the relationship comprises:

setting one of the first patterns and the second patterns as a reference pattern based on a result of the measuring of the power of the first signals and the power of the second signals;

additionally receiving a first comparison signal by forming a receiving beam having the reference pattern through the first antenna group or the second antenna group;

measuring power of the first comparison signal; and calculating a ratio between previously measured power of a second comparison signal having the reference pattern and the power of the first comparison signal.

5. The method of claim 1, wherein the analyzing of the relationship comprises:

receiving a first comparison signal through a third receiving beam formed in some of antenna elements included in the first antenna group, the first comparison signal having a reference pattern;

receiving a second comparison signal through a fourth receiving beam formed in some of antenna elements included in the second antenna group, the second comparison signal having the reference pattern;

measuring power of the first comparison signal and power of the second comparison signal; and calculating a ratio between the power of the first comparison signal and the power of the second comparison signal.

6. The method of claim 5, wherein the analyzing of the relationship immediately precedes or immediately follows the receiving of the first signals and the receiving of the second signals.

7. The method of claim 1, further comprising:
sweeping the first receiving beam and the second receiving beam in parallel.

8. The method of claim 7, wherein the sweeping sweeps the first receiving beam and the second receiving beam such that an angle between the first receiving beam and the second receiving beam that are simultaneously formed is greater than or equal to a first reference value.

9. The method of claim 7, wherein the sweeping sweeps the first receiving beam and the second receiving beam such that an angle between the first receiving beam and the second receiving beam that are simultaneously formed is less than or equal to a second reference value.

10. The method of claim 1, wherein the selecting the receiving beam pattern comprises:
first summing power corresponding to a same pattern from each of the power of the first signals and the power of the fourth signals to generate a first summation;
second summing power corresponding to a same pattern from each of the power of the second signals and the power of the third signals to generate a second summation; and
selecting one of the plurality of patterns based on the first summation and the second summation.

11. The method of claim 1, wherein the selecting the receiving beam pattern comprises:
selecting a pattern with respect to the first receiving beam as one of the plurality of patterns based on the power of the first signals and the power of the fourth signals; and
selecting a pattern with respect to the second receiving beam as one of the plurality of patterns based on the power of the second signals and the power of the third signals.

12. The method of claim 1, further comprising:
selecting a transmitting beam pattern to be same as the receiving beam pattern.

13. A cell search method performed by a wireless communication device, the cell search method comprising:
receiving first signals polarized in a first direction by sweeping a first receiving beam to have first patterns of a plurality of patterns;
receiving second signals polarized in a second direction by sweeping a second receiving beam to have second patterns of the plurality of patterns;
measuring power of the first signals and power of the second signals;
calculating a ratio between power of a first comparison signal and power of a second comparison signal, the first comparison signal and the second comparison signal each corresponding to at least one reference pattern shared between the first patterns and the second patterns;
estimating, based on the ratio, power of third signals expected to be received when the first receiving beam is swept to have patterns other than the first patterns of the plurality of patterns and power of fourth signals expected to be received when the second receiving beam is swept to have patterns other than the second patterns of the plurality of patterns; and
selecting a candidate cell and a receiving beam pattern based on the power of the first signals, the power of the second signals, the power of the third signals, and the power of the fourth signals.

14. The cell search method of claim 13, wherein a number of the first patterns is same as a number of the second patterns.

15. The cell search method of claim 13, wherein the first patterns and the second patterns are set such that a correlation between the first receiving beam and the second receiving beam is less than or equal to a reference value.

16. The cell search method of claim 13, wherein the first patterns and the second patterns are set such that an accuracy of the estimating is greater than or equal to a reference value.

17. The cell search method of claim 13, further comprising:
checking a validity of the candidate cell; and
selectively re-performing the cell search method based on the validity.

18. The cell search method of claim 17, wherein the calculating of the ratio between the power of the first comparison signal and the power of the second comparison signal comprises:
resetting one of the first patterns and the second patterns as the at least one reference pattern based on a result of the measuring, in response to the ratio between the power of the first comparison signal and the power of the second comparison signal being outside a reference range;
receiving a third comparison signal additionally through the first receiving beam or the second receiving beam, the third comparison signal having a reset reference pattern;
measuring power of the third comparison signal; and
calculating a ratio between previously measured power of a fourth comparison signal having the reset reference pattern and the power of the third comparison signal.

19. A wireless communication device comprising:
a phased array including a first antenna group and a second antenna group, the phased array configured to form a beam for transmitting and receiving signals polarized in different directions; and
a processor configured to,
control sweeping such that a first receiving beam formed in the first antenna group has first patterns of a plurality of patterns and a second receiving beam formed in the second antenna group has second patterns of the plurality of patterns,
generate measured power information by measuring power of first signals polarized in a first direction received through the first receiving beam and power of second signals polarized in a second direction received through the second receiving beam,
generate estimated power information by estimating, based on the measured power information, power of third signals expected to be received through the first antenna group when the first receiving beam is swept to have patterns other than the first patterns of the plurality of patterns and power of fourth signals expected to be received through the second antenna group when the second receiving beam is swept to have patterns other than the second patterns of the plurality of patterns, and prepare for wireless communication based on the measured power information and the estimated power information.

20. The wireless communication device of claim 19, wherein the processor is further configured to,
calculate a ratio between power of a first comparison signal and power of a second comparison signal that correspond to at least one reference pattern shared between the first patterns and the second patterns, and
estimate power of the third signals and power of the fourth signals based on the ratio.

* * * * *